United States Patent
Hölscher et al.

(10) Patent No.: US 10,750,769 B2
(45) Date of Patent: Aug. 25, 2020

(54) 5-BICYCLO[2.2.1]HEPT-2-ENYL-ACETATE AS A SCENTING AND/OR FLAVORING AGENT

(71) Applicant: SYMRISE AG, Holzminden (DE)

(72) Inventors: Bernd Hölscher, Halle (DE); Marc Mansfeld, Brevörde (DE)

(73) Assignee: SYMRISE AG, Holzminden (DE)

( * ) Notice: Subject to any disclaimer, the term of this patent is extended or adjusted under 35 U.S.C. 154(b) by 0 days.

(21) Appl. No.: 16/493,325

(22) PCT Filed: Mar. 21, 2017

(86) PCT No.: PCT/EP2017/056667
§ 371 (c)(1),
(2) Date: Sep. 12, 2019

(87) PCT Pub. No.: WO2018/171865
PCT Pub. Date: Sep. 27, 2018

(65) Prior Publication Data
US 2020/0068932 A1    Mar. 5, 2020

(51) Int. Cl.
*A23L 27/20* (2016.01)
*C11B 9/00* (2006.01)

(52) U.S. Cl.
CPC .......... *A23L 27/203* (2016.08); *C11B 9/0046* (2013.01)

(58) Field of Classification Search
CPC ..................... A23L 27/203; C11B 9/0046
See application file for complete search history.

(56) References Cited

U.S. PATENT DOCUMENTS

| | | | | |
|---|---|---|---|---|
| 4,442,025 A * | 4/1984 | Boelens | ............... | C11B 9/0046 424/65 |
| 4,728,747 A * | 3/1988 | Hoffmann | ............ | C07C 31/137 512/14 |
| 4,843,061 A * | 6/1989 | Broekhof | ................. | C11B 9/00 512/22 |
| 5,674,823 A * | 10/1997 | Ricca | ..................... | C07C 43/11 510/102 |

FOREIGN PATENT DOCUMENTS

| | | |
|---|---|---|
| CH | 600799 A5 | 6/1978 |
| EP | 2177598 A1 | 4/2010 |
| JP | S5218828 A | 2/1977 |

OTHER PUBLICATIONS

International Search Report and Written Opinion dated Sep. 13, 2017, for corresponding PCT Application No. PCT/EP2017/056667.
Database WPI, Week 197718, Thomson Scientific, London, GB, AN 1977-31555Y XP002772498.

* cited by examiner

*Primary Examiner* — Nikki H. Dees
(74) *Attorney, Agent, or Firm* — Polsinelli PC

(57) ABSTRACT

The present invention primarily relates to the use of 5-bicyclo[2.2.1]hept-2-enyl-acetate as fragrance and/or flavouring substance. The invention further relates to new fragrance and/or flavour substance compositions comprising 5-bicyclo [2.2.1]hept-2-enyl-acetate and their use, perfumed and/or flavoured articles comprising 5-bicyclo[2.2.1]hept-2-enyl-acetate and various methods for imparting, modifying and/or enhancing certain olfactory and/or taste notes.

20 Claims, No Drawings

5-BICYCLO[2.2.1]HEPT-2-ENYL-ACETATE AS A SCENTING AND/OR FLAVORING AGENT

CROSS-REFERENCE TO RELATED APPLICATIONS

This application is a national stage application (under 35 U.S.C. § 371) of PCT/EP2017/056667, filed Mar. 21, 2017, which is incorporated herein by reference in its entirety.

The present invention primarily relates to the use of 5-bicyclo[2.2.1]hept-2-enyl-acetate, i.e. a compound of formula (I) as described herein, as a fragrance and/or flavour substance. The invention further relates to new fragrance and/or flavour substance compositions comprising the compound of formula (I) as described herein, perfumed and/or flavoured articles comprising the compound of formula (I) as described herein, and various methods for imparting, modifying and/or enhancing certain olfactory and/or taste notes.

Further aspects and preferred embodiments of the present invention result from the following explanations, the attached examples and, in particular, the attached patent claims.

Despite a large number of existing fragrance and/or flavour substances, there is still a general need for new fragrance and/or flavour substances in the perfume and flavour industry. For example, there is a need for fragrance and/or flavour substances that are capable (in fragrance and/or flavour substance compositions) of producing not only a primary olfactory and/or taste note but also further interesting notes and of expanding the possibilities of the perfumer or flavourist with their novel or inventive olfactory properties.

In particular, there is an interest in fragrance substances that are able to form a harmonious combination with floral and/or fruity fragrance substances. Preferably, the different olfactory aspects and notes should be superimposed in order to create an overall complex olfactory impression.

For the creation of novel compositions, there is a constant need for fragrance and/or flavour substances with special sensory properties that can serve as a basis for the composition of novel perfumes or flavourings with a complex sensory character. Preferred sought-after fragrance and/or flavour substances should have, in addition to a particular note, other notes and aspects that give them character and complexity.

The search for suitable substances that led to the present invention was complicated by the following facts:

The mechanisms of olfactory perception are not sufficiently known;

the connections between the specific olfactory perception on the one hand and the chemical structure of the associated fragrance substance on the other hand have not been sufficiently researched;

often even minor changes in the structural set-up of a known fragrance substance cause major changes in the sensory properties and affect the tolerance for the human organism.

The primary object was to find fragrance and/or flavour substances that have an interesting, preferably complex, and inventive sensory profile and are suitable as fragrance substances for use in perfumery or as flavour substances for flavouring e.g. edible preparations.

The sought-after substances should enable the production of novel fragrance and/or flavour substance compositions with special olfactory or taste notes and aspects.

Substances which are particularly suitable for combination with other fragrance or flavour substances would be advantageous.

In addition, fragrance and/or flavour substances fulfilling this primary object should preferably have additional positive secondary properties in addition to their primary, i.e. olfactory or taste properties, properties, such as e.g. high stability under certain application conditions, high yield, good adhesion, high substantivity or odour and/or flavour enhancing properties (so-called booster or enhancer effect) and/or, in combination with other fragrance and/or flavour substances, round off their naturalness, freshness, fullness, (radiant) power and/or radiance so that remarkable sensory effects can be achieved.

The primary assigned object is solved according the invention by using the compound of formula (I) (5-bicyclo[2.2.1]hept-2-enyl-acetate, CAS No. 6143-29-9)

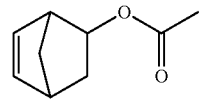

as fragrance and/or flavour substance.

The compound of formula (I) to be used according to the invention can be present in any stereoisomeric form or can be present as any mixture of stereoisomers (e.g. exo/endo-isomer mixture, diastereomer mixture, racemate).

The compound of formula (I) has its own unique olfactory properties, which clearly stand out from and exceed those of the known fragrance and/or flavour substances. In particular, it has an (inherent) smell or taste of banana, raspberry, blackcurrant and melon. The suitability of the compound of formula (I) as a fragrance and/or flavour substance was not known to date. It is therefore particularly surprising that a fragrance and/or flavour substance with valuable, interesting and complex olfactory properties could be found in the already well investigated field.

Preferably, the use according to the invention relates to a use for imparting, modifying and/or enhancing one or several olfactory and/or taste notes selected from the group consisting of the notes green, herbaceous, fresh, fruity, floral, woody, sweet, earthy, greasy, metallic and balsamic, preferably one or several of the olfactory and/or taste notes selected from the group consisting of the notes green and fruity, preferably one or several olfactory and/or taste notes selected from the group consisting of the notes banana, raspberry, blackcurrant and melon.

A preferred embodiment relates to the use of the compound of formula (I) to impart one, two or several olfactory and/or taste notes selected from the group consisting of the notes green, herbaceous, fresh, fruity, floral, woody, sweet, earthy, greasy, metallic and balsamic.

Another preferred embodiment relates to the use of the compound of formula (I) for imparting a green and/or fruity olfactory and/or taste note and additionally one, two or several olfactory and/or taste notes selected from the group consisting of the notes green, herbaceous, fresh, fruity, floral, woody, sweet, earthy, greasy, metallic and balsamic.

A particularly preferred embodiment relates to the use of the compound of formula (I) for imparting a green and fruity olfactory and/or taste note and additionally one, two or several olfactory and/or taste notes selected from the group consisting of the notes herbaceous, fresh, floral, woody, sweet, earthy, greasy, metallic and balsamic.

The fact that the compound of formula (I) to be used according to the invention may convey a very complex and varied olfactory and/or taste impression, which otherwise can only be achieved by mixtures of several components (e.g. essential oils or spice mixtures), is particularly surprising.

In addition to the primary, namely fragrance and flavour, properties, the compound of formula (I) also has positive secondary properties, in particular good adhesion and a high substantivity compared to fragrances with similar olfactory properties, as well as high stability in certain media and preparations and a high yield, and is also biodegradable.

The compound of the formula (I) to be used in according to the invention has a high, completely outstanding stability, in particular in largely neutral media, but in particular in alkaline and/or oxidizing media. In particular because of these properties, the compound of formula (I) is excellently suited for use as a fragrance and/or flavour substance, in particular when it is used in perfumed or flavoured articles (preparations) having a pH of 5.5 or greater, preferably greater than or equal to 6, preferably greater than 7, more preferably greater than 7.5, more preferably greater than 8; also in oxidizing preparations preferably having a pH of greater than or equal to 7, preferably in oxidizing preparations having a pH of greater than or equal to 8. The indicated pH values refer to values measured at 25° C., respectively.

The compound of formula (I) to be used according to the invention can also increase the intensity of a mixture of fragrance and/or flavour substance mixture (fragrance and/or flavour substance composition) and round off the overall picture of the mixture in fragrance and/or flavour and can be used to give a fragrance or flavour substance composition more fullness, freshness, (radiant) power, radiance, luster, rounding, harmony and/or naturalness.

If, in the context of this text, a discrepancy should inadvertently occur between the chemical name and the presented structural formula of the compound of formulae (I), the structural formula presented shall apply.

It is advantageous that the compound of formula (I) to be used in according to the invention also has sweet and/or fruity sensory properties, in particular a smell and/or taste of honeydew melon.

The compound of formula (I) is already known from the literature (see e.g. JP58016900 or U.S. Pat. No. 3,047,433). However, the state of the art does not describe its sensory properties and its suitability as fragrance and/or flavour substance.

The compound of formula (I) to be used according to the invention may be prepared by reactions and processes known per se. For example, dicyclopentadiene can be reacted with vinyl acetate at 160-180° C. to obtain the compound of formula (I) (the starting materials used are commercially available):

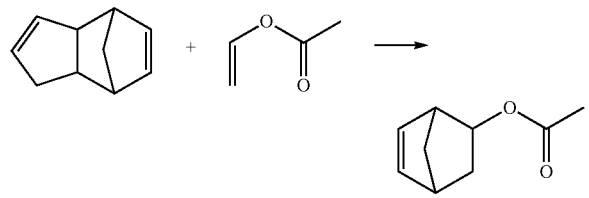

The compound of formula (I) to be used according to the invention is normally used in a sensorially effective amount within the framework of the use according to the invention, i.e. in a total amount in which it exerts a sensorial effect. The compound of formula (I) to be used in accordance with the invention is preferably used together with other fragrance and/or flavour substances. Such fragrance and/or flavour substance compositions may be prepared in the usual way, for example by simple mixing or homogenisation of the ingredients. These further fragrance and/or flavour substances can be any other fragrance and/or flavour substances (preferred combinations result from the following explanations).

A further aspect of the present invention therefore relates to a fragrance and/or flavour substance composition comprising or consisting of the compound of formula (I)

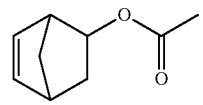

and one, two, three, four, five, six, seven, eight, nine, ten or more further fragrance and/or flavour substance(s), wherein the weight ratio of the total amount of compound of formula (I) to the total amount of further fragrance and/or flavour substance(s) is in the range from 1:1000 to 1:0.1, preferably from 1:1000 to 1:0.5.

Thereby, it is preferred when the total amount of compound of formula (I), based on the total weight of the fragrance and/or flavour substance composition, is in the range from 0.0001 to 99.9% by weight, preferably 0.001 to 99.5% by weight, particularly preferably 0.01 to 99% by weight, 0.01 to 90% by weight, 0.05 to 80% by weight, 0.1 to 70% by weight, 0.25 to 50% by weight, 0.5 to 40% by weight or 0.75 to 25% by weight.

If the compound of the formula (I) is mainly used to impart more freshness, radiance, rounding, harmony and/or naturalness to a fragrance and/or flavour substance composition and/or to enhance certain notes (already present through further fragrance and/or flavour substances), the total amount of the compound of the formula (I) can also be chosen comparatively low and can be e.g. preferably in the range from 0.01 to 5% by weight, more preferably in the range from 0.1 to 2% by weight, based on the total amount of the fragrance and/or flavour substance composition. If a comparatively low concentration is selected within the preferred concentration ranges, it may not yet be possible in some cases, depending on the other components of the respective composition, to obtain the above-mentioned inherent olfactory and/or taste notes. Thus, depending on the desired effect of the compound of formula (I), the expert can select an amount of compound of formula (I) which is suitable for the respective application.

Due to its olfactory properties, the compound of formula (I) is excellently suited for use in fragrance and/or flavour substance compositions according to the invention. The compound of formula (I) can be advantageously combined with a large number of other fragrance and/or flavour substances and used in numerous different products and articles.

Preferably, it applies to a fragrance and/or flavour substance composition according to the invention that the total amount of compound of formula (I) in the fragrance and/or flavour substance composition is contained in a sensorially effective amount, preferably in an amount sufficient to impart and/or enhance one or several olfactory and/or taste notes selected from the group consisting of the notes green, herbaceous, fresh, fruity, floral, woody, sweet, earthy, greasy, metallic and balsamic, preferably at least one of the olfactory and/or taste notes selected from the group consisting of the notes green and fruity, preferably at least one of the olfactory and/or taste notes selected from the group consisting of the notes banana, raspberry, blackcurrant and melon, preferably melon, and/or to modify one or several olfactory and/or taste notes of a or the further fragrance and/or flavour substance(s) of the fragrance and/or flavour substance composition in the direction of one or several of these olfactory and/or taste notes.

It is particularly preferred when
(i) the or one, several or all of the further fragrance and/or flavour substances (also) impart, modify and/or enhance one or several olfactory and/or taste notes selected from the group consisting of the notes green, herbaceous, fresh, fruity, floral, woody, sweet, earthy, greasy, metallic and balsamic, preferably one or several of the olfactory and/or taste notes selected from the group consisting of the notes green and fruity, particularly preferably selected from the group consisting of the notes banana, raspberry, blackcurrant and melon,
or wherein
(ii) the or one, several or all of the further fragrance and/or flavour substances impart, modify and/or enhance one or several olfactory and/or taste notes other than those mentioned in (i).

According to another embodiment, it is preferred when the or one, several or all of the further fragrance and/or flavour substances (also) impart, modify and/or enhance one or several olfactory and/or taste notes selected from the group consisting of the notes woody, fruity and floral.

Examples of fragrance and/or flavour substances that can be advantageously combined with the compound of formula (I) within the scope of the present invention can be found, for example, in S. Arctander, Perfume and Flavor Materials, Vol. I and II, Montclair, N. J. 1969, Eigenverlag, or K. Bauer et al., Common Fragrance and Flavor Materials, 4th Edition, Wiley-VCH, Weinheim 2001.

To be mentioned in detail: Extracts from natural raw materials such as essential oils, concretes, absolues, resins, resinoids, balsams, tinctures such as
ambra tincture; amyris oil; angelica seed oil; angelica root oil; anise oil; valerian oil; basil oil; tree moss absolute; bay oil; mugwort oil; benzoe resin; bergamot oil; beeswax absolue; birch tar oil; bitter almond oil; savory oil; bucco leaf oil; cabreuva oil; cade oil; calmus oil; camphor oil; cananga oil; cardamom oil; cascarilla oil; cassia oil; cassie absolute; castoreum absolute; cedar leaf oil; cedar wood oil; cistus oil; citronella oil; lemon oil; copaiba balsam; copaiba balsam oil; coriander oil; costus root oil; cumin oil; cypress oil; davana oil; dill herb oil; dill seed oil; eau de brouts absolue; oak moss absolute; elemi oil; tarragon oil; eucalyptus citriodora oil; eucalyptus oil; fennel oil; spruce needle oil; galbanum oil; galbanum resin; geranium oil; grapefruit oil; guaiac wood oil; gurjun balsam; gurjun balsam oil; helichrysum absolue; helichrysum oil; ginger oil; iris root absolue; iris root oil; jasmine absolue; calamus oil; chamomile oil blue; roman chamomile oil; carrot seed oil; cascarilla oil; pine needle oil; spearmint oil; caraway oil; labdanum oil; labdanum absolue; labdanum resin; lavandin absolue; lavandin oil; lavender absolue; lavender oil; lemongrass oil; lovage oil; distilled lime oil; pressed lime oil; linaloe oil; litsea cubeba oil; bay leaf oil; macis oil; marjoram oil; mandarin oil; massoi rind oil; mimosa absolue; musk seed oil; musk tincture; muscat sage oil; nutmeg oil; myrrh absolue; myrrh oil; myrtle oil; clove leaf oil; clove blossom oil; neroli oil; olibanum absolue; olibanum oil; opopanax oil; orange blossom absolue; orange oil; origanum oil; palmarosa oil; patchouli oil; perilla oil; Peru balsam oil; parsley leaf oil; parsley seed oil; petit grain oil; peppermint oil; pepper oil; pimento oil; pine oil; poley oil; rose absolue; rosewood oil; rose oil; rosemary oil; sage oil Dalmatian; sage oil Spanish; sandalwood oil; celery seed oil; spiked lavender oil; star anise oil; styrax oil; marigold oil; fir needle oil; tea tree oil; turpentine oil; thyme oil; tolu balsam; tonka absolue; tuberose absolute; vanilla extract; violet leaf absolute; verbena oil; vetiver oil; juniper berry oil; wine yeast oil; wormwood oil; wintergreen oil; ylang oil; ysop oil; zibet absolue; cinnamon leaf oil; cinnamon bark oil and fractions thereof, or ingredients isolated therefrom;

Single fragrance substances from the group of hydrocarbons, such as e.g. 3-carene; α-pinene; β-pinene; α-terpinene; γ-terpinene; p-cymol; bisabolene; camphene; caryophyllene; cedrene; farnesene; limonene; longifolene; myrcene; ocimene; valencene; (E,Z)-1,3,5-undecatriene; styrene; diphenylmethane;

of aliphatic alcohols such as e.g. hexanol; octanol; 3-octanol; 2,6-dimethylheptanol; 2-methyl-2-heptanol; 2-methyl-1-octanol; (E)-2-hexenol; 1-octen-3-ol; mixture of 3,4,5,6,6-pentamethyl-3/4-hepten-2-ol and 3,5,6,6-tetramethyl-4-methyleneheptan-2-ol; (E,Z)-2,6-nonadienol; 3,7-dimethyl-7-methoxyoctan-2-ol; 9-decenol; 10-undecenol; 4-methyl-3-decen-5-ol;

of aliphatic aldehydes and their acetals such as e.g. hexanal; heptanal; octanal; nonanal; decanal; undecanal; dodecanal; 2-methyloctanal; 2-methylnonanal; (E)-2-hexenal; (Z)-4-heptenal; 2,6-dimethyl-5-heptenal; 10-undecenal; (E)-4-decenal; 2-dodecenal; 2,6,10-trimethyl-9-undecenal; 2,6,10-trimethyl-5,9-undecadienal; heptanaldiethylacetal; 1,1-dimethoxy-2,2,5-trimethyl-4-hexene; citronellyl oxyacetaldehyde; 1-(1-methoxy-propoxy)-(E/Z)-3-hexene;

of aliphatic ketones and their oximes such as e.g. 2-heptanone; 2-octanone; 3-octanone; 2-nonanone; 5-methyl-3-heptanone; 5-methyl-3-heptanone oxime; 2,4,4,7-tetramethyl-6-octen-3-one; 6-methyl-5-hepten-2-one;

of aliphatic sulphur-containing compounds such as e.g. 3-methylthiohexanol; 3-methylthiohexyl acetate; 3-mercaptohexanol; 3-mercaptohexyl acetate; 3-mercaptohexyl butyrate; 3-acetylthiohexyl acetate; 1-menthene-8-thiol;

of aliphatic nitriles such as e.g. 2-nonenoic acid nitrile; 2-undecenoic acid nitrile; 2-tridecenoic acid nitrile; 3,12-tridecadienoic acid nitrile; 3,7-dimethyl-2,6-octadienoic acid nitrile; 3,7-dimethyl-6-octenoic acid nitrile;

of esters of aliphatic carboxylic acids, e.g. (E)- and (Z)-3-hexenyl formate; ethyl acetoacetate; isoamyl acetate; 3,5,5-trimethylhexyl acetate; 3-methyl-2-butenyl acetate; (E)-2-hexenyl acetate; (E)- and (Z)-3-hexenyl acetate; octyl acetate; 3-octyl acetate; 1-octen-3-yl acetate; ethyl butyrate; butyl butyrate; isoamyl butyrate; hexyl butyrate; (E)- and (Z)-3-hexenyl isobutyrate; hexyl crotonate; ethyl isovalerate; ethyl 2-methyl pentanoate; ethyl hexanoate; allyl hexanoate; ethyl heptanoate; allyl heptanoate; ethyl octanoate; ethyl-(E,Z)-2,4-decadienoate; methyl-2-octinate; methyl-2-noninate; allyl-2-isoamyloxyacetate; methyl-3,7-dimethyl-2,6-octadienoate; 4-methyl-2-pentyl crotonate;

of acyclic terpene alcohols such as e.g. geraniol; nerol; lavadulol; nerolidol; farnesol; tetrahydrolinalool; tetrahydrogeraniol; 2,6-dimethyl-7-octen-2-ol; 2,6-dimethyloctan-2-ol; 2-methyl-6-methylene-7-octen-2-ol; 2,6-dimethyl-5,7-octadien-2-ol; 2,6-dimethyl-3,5-octadien-2-ol; 3,7-dimethyl-4,6-octadien-3-ol; 3,7-dimethyl-1,5,7-octatrien-3-ol 2,6-dimethyl-2,5,7-octatrien-1-ol; and their formates, acetates, propionates, isobutyrates, butyrates, isovalerates, pentanoates, hexanoates, crotonates, tiglinates and 3-methyl-2-butenoates;

of acyclic terpene aldehydes and ketones such as e.g. citronellal; 7-methoxy-3,7-dimethyloctanal; 2,6,10-trimethyl-9-undecenal; geranylacetone; and the dimethyl and diethyl acetals of geranial, neral;

of cyclic terpene alcohols such as e.g. menthol; isopulegol; alpha-terpineol; terpinenol-4; menthan-8-ol; menthan-1-ol; menthan-7-ol; borneol; isoborneol; linalool oxide; nopol; cedrol; ambrinol; vetiverol; guaiol; and their formates, acetates, propionates, isobutyrates, butyrates, isovalerianates, pentanoates, hexanoates, crotonates, tiglinates and 3-methyl-2-butenoates;

of cyclic terpene aldehydes and ketones such as e.g. menthone; isomenthone; 8-mercaptomenthan-3-one; carvone; camphor; fenchone; alpha-ionone; beta-ionone; alpha-n-methylionone; beta-n-methylionone; alpha-isomethylionone; beta-isomethyl-ionone; alpha-iron; beta-damascenone; 1-(2,4,4-trimethyl-2-cyclohexen-1-yl)-2-buten-1-one; 1,3,4,6,7,8a-hexahydro-1,1,5,5-tetramethyl-2H-2,4a-methanonaphthalen-8(5H)-one; 2-methyl-4-(2,6,6-trimethyl-1-cyclohexen-1-yl)-2-butenal; nootkatone; dihydronootkatone; 4,6,8-megastigmatrien-3-one; alpha-sinensal; beta-sinensal; acetylated cedarwood oil (methylcedrylketone);

of cyclic alcohols such as e.g. 4-tert.-butylcyclohexanol; 3,3,5-trimethylcyclohexanol; 3-isocamphylcyclohexanol; 2,6,9-trimethyl-Z2,Z5, E9-cyclododecatrien-1-ol; 2-isobutyl-4-methyltetrahydro-2H-pyran-4-ol;

of cycloaliphatic alcohols such as e.g. alpha,3,3-trimethyl-cyclohexylmethanol; 1-(4-isopropylcyclohexyl)ethanol; 2-methyl-4-(2,2,3-trimethyl-3-cyclopent-1-yl)butanol; 2-methyl-4-(2,2,3-trimethyl-3-cyclopent-1-yl)-2-buten-1-ol; 3-methyl-5-(2,2,3-trimethyl-3-cyclopent-1-yl)-pentan-2-ol; 3-methyl-5-(2,2,3-trimethyl-3-cyclopent-1-yl)-4-penten-2-ol; 3,3-di methyl-5-(2,2,3-trimethyl-3-cyclopent-1-yl)-4-penten-2-ol; 1-(2,2,6-trimethylcyclohexyl)pentan-3-ol; 1-(2,2,6-trimethylcyclohexyl)hexan-3-ol;

of cyclic and cycloaliphatic ethers such as e.g. cineol; cedryl methyl ether; cyclododecyl methyl ether; 1,1-dimethoxycyclododecane; (ethoxymethoxy)cyclo-dodecane; alpha-cedrene epoxide; 3a,6,6,9a-tetramethyldodecahydro-naphtho[2,1-b]furane; 3a-ethyl-6,6,9a-trimethyldodecahydronaphtho[2,1b]furan; 1,5,9-trimethyl-13-oxabicyclo[10.1.0]trideca-4,8-diene; rose oxide; 2-(2,4-dimethyl-3-cyclohexen-1-yl)-5-methyl-5-(1-methylpropyl)-1,3-dioxane;

of cyclic and macrocyclic ketones such as e.g. 4-tert.-butylcyclohexanone; 2,2,5-trimethyl-5-pentylcyclopentanone; 2-heptylcyclopentanone; 2-pentylcyclopentanone; 2-hydroxy-3-methyl-2-cyclopenten-1-one; 3-methyl-cis-2-penten-1-yl-2-cyclopenten-1-one; 3-methyl-2-pentyl-2-cyclopenten-1-one; 3-methyl-4-cyclopentadecenone; 3-methyl-5-cyclopentadecenone; 3-methylcyclopenta-decanone; 4-(1-ethoxyvinyl)-3,3,5,5-tetramethylcyclohexanone; 4-tert.-pentylcyclo-hexanone; 5-cyclohexadecen-1-one; 6,7-dihydro-1,1,2,3,3-pentamethyl-4(5H)-indanone; 8-cyclohexadecen-1-one; 9-cycloheptadecen-1-one; cyclopentadecanone; cyclohexadecanone;

of cycloaliphatic aldehydes such as e.g. 2-methyl-4-(2,2,6-trimethyl-cyclohexen-1-yl)-2-butenal; 4-(4-hydroxy-4-methylpentyl)-3-cyclohexene carbaldehyde; 4-(4-methyl-3-penten-1-yl)-3-cyclohexene carbaldehyde;

of cycloaliphatic ketones such as e.g. 1-(3,3-dimethylcyclohexyl)-4-penten-1-one; 2,2-dimethyl-1-(2,4-dimethyl-3-cyclohexen-1-yl)-1-propanone; 1-(5,5-dimethyl-1-cyclohexen-1-yl)-4-penten-1-one; 2,3,8,8-Tetramethyl-1,2,3,4,5,6,7,8-octahydro-2-naphtalenylmethylketone; methyl-2,6,10-trimethyl-2,5,9-cyclododecatrienylketone; tert.-butyl-(2,4-dimethyl-3-cyclohexen-1-yl)ketone;

of esters of cyclic alcohols such as e.g. 2-tert-butylcyclohexyl acetate; 4-tert-butylcyclohexyl acetate; 2-tert-pentylcyclohexyl acetate; 4-tert-pentylcyclohexyl acetate; 3,3,5-trimethylcyclohexyl acetate; decahydro-2-naphthyl acetate; 2-cyclo-pentylcyclopentylcrotonate; 3-pentyltetrahydro-2H-pyran-4-yl acetate; decahydro-2,5,5,8a-tetramethyl-2-naphthyl acetate; 4,7-methano-3a,4,5,6,7,7a-hexa-hydro-5, or 6-indenyl acetate; 4,7-methano-3a,4,5,6,7,7a-hexahydro-5, or 6-indenyl propionate; 4,7-methano-3a,4,5,6,7,7a-hexahydro-5, or 6-indenyl isobutyrate; 4,7-methanooctahydro-5, or 6-indenyl acetate;

of esters of cycloaliphatic alcohols such as e.g. 1-cyclohexylethylcrotonate; of esters of cycloaliphatic carboxylic acids such as e.g. allyl-3-cyclohexylpropionate; allylcyclohexyloxyacetate; cis- and trans-methyldihydrojasmonate; cis- and trans-methyljasmonate; methyl-2-hexyl-3-oxocyclopentanecarboxylate; ethyl-2-ethyl-6,6-dimethyl-2-cyclohexene carboxylate; ethyl-2,3,6,6-tetramethyl-2-cyclohexene carboxylate; ethyl-2-methyl-1,3-dioxolane-2-acetate;

of araliphatic alcohols such as e.g. benzyl alcohol; 1-phenylethyl alcohol; 3-phenylpropanol; 2-phenylpropanol; 2-phenoxyethanol; 2,2-dimethyl-3-phenylpropanol; 2,2-dimethyl-3-(3-methylphenyl)propanol; 1,1-dimethyl-2-phenylethyl alcohol; 1,1-dimethyl-3-phenylpropanol; 1-ethyl-1-methyl-3-phenylpropanol; 2-methyl-5-phenylpentanol; 3-methyl-5-phenylpentanol; 3-phenyl-2-propen-1-ol; 4-methoxybenzyl alcohol; 1-(4-isopropylphenyl)ethanol;

of esters of araliphatic alcohols and aliphatic carboxylic acids such as e.g. benzylacetate; benzyl propionate; benzyl isobutyrate; benzyl isovalerianate; 2-phenylethyl acetate; 2-phenylethyl propionate; 2-phenylethyl isobutyrate; 2-phenyl ethyl isovalerate; 1-phenylethyl acetate; alpha-trichloromethylbenzyl acetate; alpha,alpha-dimethylphenylethyl acetate; alpha,alpha-dimethylphenylethyl butyrate; cinnamyl acetate; 2-phenoxyethyl isobutyrate; 4-methoxybenzyl acetate;

of araliphatic ethers such as e.g. 2-phenylethyl methyl ether; 2-phenylethyl isoamyl ether; 2-phenylethyl-1-ethoxyethyl ether; phenylacetaldehyde dimethylacetal; phenylacetaldehyde diethylacetal; hydratropaaldehyde dimethylacetal; phenylacetaldehyde glycerol acetal; 2,4,6-trimethyl-4-phenyl-1,3-dioxane; 4,4a,5,9b-tetrahydroindeno[1,2-d]-m-dioxin; 4,4a,5,9b-tetrahydro-2,4-dimethylindeno[1,2-d]-m-dioxin;

of aromatic and araliphatic aldehydes such as e.g. benzaldehyde; phenylacetaldehyde; 3-phenylpropanal; hydratropaaldehyde; 4-methylbenzaldehyde; 4-methylphenylacetaldehyde; 3-(4-ethylphenyl)-2,2-dimethylpropanal; 2-methyl-3-(4-isopropylphenyl)propanal; 2-methyl-3-(4-isobutyl-phenyl)propanal; 3-(4-tert.-butyl-phenyl)propanal; cinnamic aldehyde; alpha-butyl cinnamic aldehyde; alpha-hexyl cinnamic aldehyde; 3-methyl-5-phenylpentanal; 4-methoxybenzaldehyde; 4-hydroxy-3-methoxybenzaldehyde; 4-Hydroxy-3-ethoxybenzaldehyde; 3,4-methylenedioxybenzaldehyde; 3,4-dimethoxybenzaldehyde; 2-methyl-3-(4-methoxyphenyl)propanal; 2-methyl-3-(4-methylenedioxyphenyl)propanal;

of aromatic and araliphatic ketones such as e.g. acetophenone; 4-methylacetophenone; 4-methoxyacetophenone; 4-tert.-butyl-2,6-dimethylaceto-phenone; 4-phenyl-2-butanone; 4-(4-hydroxyphenyl)-2-butanone; 1-(2-naphtha-lenyl)ethanone; 2-benzofuranylethanone; (3-methyl-2-benzofuranyl)ethanone; benzophenone; 1,1,2,3,3,6-hexamethyl-5-indanylmethylketone; 6-tert-butyl-1,1-di-methyl-4-indanylmethylketone; 1-[2,3-dihydro-1,1,2,6-tetramethyl-3-

(1-methylethyl)-1H-5-indenyl]ethanone; 5',6',7',8'-tetrahydro-3',5',5',6',8',8'-hexamethyl-2-aceto-naphthone;

of aromatic and araliphatic carboxylic acids and their esters such as e.g. benzoic acid; phenylacetic acid; methyl benzoate; ethyl benzoate; hexyl benzoate; benzyl benzoate; methyl phenyl acetate; ethyl phenyl acetate; geranyl phenyl acetate; phenylethyl phenyl acetate; methyl cinnamate; ethyl cinnamate; benzyl cinnamate; phenylethyl cinnamate; cinnamyl cinnamate; allyl phenoxy acetate; methyl salicylate; hexyl salicylate; cyclohexyl salicylate; cis-3-hexenyl salicylate; benzylsalicylate; phenylethyl salicylate; methyl 2,4-dihydroxy-3,6-dimethylbenzoate; ethyl-3-phenylglycidate; ethyl-3-methyl-3-phenylglycidate;

of nitrogen-containing aromatic compounds such as e.g. 2,4,6-trinitro-1,3-dimethyl-5-tert.butylbenzene; 3,5-dinitro-2,6-dimethyl-4-tert.-butylacetophenone; cinnamic acid nitrile; 3-methyl-5-phenyl-2-pentenoic acid nitrile; 3-methyl-5-phenylpentanoic acid nitrile; methylanthranilate; methy-N-methylanthranilate; Schiff bases of methylanthranilate with 7-hydroxy-3,7-dimethyloctanal, 2-methyl-3-(4-tert.-butyl-phenyl)propanal or 2,4-dimethyl-3-cyclohexene carbaldehyde; 6-isopropyl quinoline; 6-isobutylquinoline; 6-sec.-butylquinoline; 2-(3-phenylpropyl)pyridine; indole; skatol; 2-methoxy-3-isopropylpyrazine; 2-isobutyl-3-methoxypyrazine;

of phenols, phenyl ethers and phenylesters such as estragol; anethol; eugenyl methylether; isoeugenol; isoeugenyl methylether; thymol; carvacrol; diphenylether; beta-naphthylmethylether; beta-naphthylethylether; beta-naphthylisobutylether; 1,4-dimethoxybenzol; eugenylacetate; 2-methoxy-4-methylphenol; 2-ethoxy-5-(1-propenyl)phenol; p-kresylphenylacetate;

of heterocyclic compounds such as e.g. 2,5-dimethyl-4-hydroxy-2H-furan-3-one; 2-ethyl-4-hydroxy-5-methyl-2H-furan-3-one; 3-hydroxy-2-methyl-4H-pyran-4-one; 2-ethyl-3-hydroxy-4H-pyran-4-one;

of lactones such as e.g. 1,4-octanolide; 3-methyl-1,4-octanolide; 1,4-nonanolide; 1,4-decanolide; 8-decene-1,4-olide; 1,4-undecanolide; 1,4-dodecanolide; 1,5-decanolide; 1,5-dodecanolide; 4-methyl-1,4-decanolide; 1,15-pentadecanolide; 1,16-hexadeca-nolide; 9-hexadecene-1,16-olide; 10-oxa-1,16-hexadecanolide; 11-oxa-1,16-hexa-decanolide; 12-oxa-1,16-hexadecanolide; ethylene-1,12-dodecanedioate; ethylene-1,13-tridecanedioate; 2,3-dihydrocoumarin; octahydrocoumarin.

According to a preferred embodiment of the fragrance and/or flavour substance composition according to the invention, the compound of formula (I) to be used according to the invention is preferably combined with one or several, particularly preferably with two, three, four, five or more, floral and/or fruity further fragrance and/or flavour substances.

Accordingly, the present invention also concerns a fragrance and/or flavour substance composition comprising one, two, three, four, five or more (further) fragrance and/or flavour substances which impart a floral and/or fruity olfactory and/or taste note.

Thereby, the compound of formula (I) to be used according to the invention advantageously (at least partially) enhances the fragrance and/or taste of the floral and/or fruity notes.

Floral fragrance and/or flavour substances with which the compound of formula (I) to be used according to the invention (in particular in fragrance and/or flavour substance compositions according to the invention) can be advantageously combined, are preferably selected from the group consisting of:

Hydroxycitronellal, methoxycitronellal, cyclamenaldehyde [2-methyl-3-(4-isopropylphenyl)propanal], 1-(4-isopropylcyclohexyl)ethanol (Mugetanol®), 4-tert.-butyl-methyldihydrocinnamic aldehyde (Lilial®), cis-hexahydrocuminyl alcohol (Mayol®), 3-[4-(1,1-dimethylethyl)phenyl]propanal (Bourgenonal®), 2,2-dimethyl-3-(3-methylphenyl)propanol (Majantol®), 3-methyl-3-(3-methylbenzyl)-butan-2-ol, 2-isobutyl-4-methyltetrahydro-2H-pyran-4-ol (Florosa®), 2-methyl-3-(3,4-methylenedioxyphenyl)propanal (Heliofolal®), 4-(4-hydroxy-4-methylpentyl)-3-cyclohexene carbaldehyde (Lyrall, 4-(octahydro-4,7-methano-5H-inden-5-ylidene-butanal (Dupical®), vernaldehyde, 4-(4-methyl-3-penten-1-yl)-3-cyclohexene carbaldehyde (Vertomugall, octahydro-5-(4-methoxybutylidene)-4,7-methano-H-indene (Mugoflorl, 2,6-dimethyl-2-heptanol (Freesiol®), 1-ethyl-1-methyl-3-phenylpropanol (Phemec®), 2,2-dimethyl-3-phenyl-1-propanol (Muguet alcohol), profarnesol, dihydrofarnesol, farnesol, nerolidol, hydroxycitronellaldimethylacetal, hexylbenzoate, geraniol, nerol, linalool, tetrahydrogeraniol, tetrahydrolinalool, ethyllinalool, geranyltiglinate, phenethyl alcohol (2-phenylethyl alcohol), citronellol, rose oxide, 2-methyl-5-phenylpentanol (Rosaphene), 3-methyl-5-phenylpentanol (phenoxanol), methyldihydrojasmonate (Hedion®, Hedione® high cis), 2-heptylcyclopentanone (Projasmon P), cis-jasmone, dihydrojasmone, cinnamic alcohol (3-phenyl-2-propen-1-ol), dihydrocinnamic alcohol (3-phenylpropanol), 2-methyl-4-phenyl-1,3-dioxolane (Jacinthaflor®) and dihydromyrcenol (2,6-dimethyl-7-octen-2-ol).

In addition, the compound of formula (I) to be used according to the invention is advantageously suitable for enhancing fruity fragrance and/or flavour substances, in particular fruity fragrance substances, with respect to their odour and/or taste.

Fruity fragrance and/or flavour substances with which the compound of formula (I) to be used according to the invention can be advantageously combined, and which are therefore particularly preferred (further) fragrance and/or flavour substances of a fragrance and/or flavour substance composition according to the invention, are preferably selected from the group consisting of:

2-Methyl-butyric acid ethyl ester, 4-(p-hydroxyphenyl)-2-butanone, ethyl-3-methyl-3-phenylglycidate, butyric acid isoamyl ester, acetic acid isoamyl ester, acetic acid n-butyl ester, butyric acid ethyl ester, 3-methyl-butyric acid ethyl ester, n-hexanoic acid ethyl ester, n-hexanoic acid allyl ester, ethyl-2-trans-4-cis-decadienoate, 1,1-dimethoxy-2,2,5-trimethyl-4-hexane, 2,6-dimethyl-5-hepten-1-al, gamma-undecalactone, gamma-nonalactone, hexanal, 3Z-hexenal, n-decanal, n-dodecanal, citral, vanillin, ethylvanillin, maltol, ethylmaltol and mixtures thereof.

Fragrance and/or flavour substance compositions according to invention, which contain the compound of formula (I), can be in liquid form, undiluted or diluted with a solvent or are advantageously used for perfuming or flavouring. Preferred solvents therefore are ethanol, isopropanol, diethylene glycol monoethyl ether, glycerol, propylene glycol, 1,2-butylene glycol, dipropylene glycol, diethyl phthalate, triethyl citrate, isopropyl myristate, triacetine and diacetine.

In addition, fragrance and/or flavour substance compositions according to the invention may be adsorbed to a carrier which ensures both a fine distribution of the fragrance and/or flavour substances in the product and a controlled release during application. Such carriers may be porous inorganic materials such as light sulphate, silica gels, zeolites, gypsums, clays, clay granules, gas concrete, etc. or organic materials such as wood, cellulose-based materials, sugars, dextrins (e.g. maltodextrin) or plastics such as PVC, polyvinyl acetates or polyurethanes. The combination of composition according to the invention and carrier is also to be understood as fragrance and/or flavour substance composition according to the invention or may be present as an article according to the invention (as described below).

Fragrance and/or flavour substance compositions or articles (as described herein below) according to the invention may also be present in microencapsulated form, spray-dried form, as inclusion complexes or as extrusion products and—in case of a fragrance and/or flavour substance composition—may be added in this form to an article to be perfumed or flavoured (as described herein below).

If applicable, the properties of such modified compositions or articles can be further optimised by so-called "coating" with suitable materials in view of a more targeted release of fragrance, preferably using wax-like plastics such as e.g. polyvinyl alcohol. The resulting products in turn are articles according to the invention.

Microencapsulation can, for example, be achieved by the so-called coacervation process with the aid of capsule materials, e.g. polyurethane-like substances or soft gelatine.

Spray-dried products are preferably produced by spray-drying an emulsion or dispersion containing the fragrance and/or flavour substance composition, whereby modified starches, proteins, dextrins and vegetable gums can be used as carriers.

Inclusion complexes can be prepared e.g. by incorporating dispersions of the fragrance and/or flavour substance composition and cyclodextrins or urea derivatives into a suitable solvent, e.g. water.

Extrusion products can be obtained e.g. by fusing the fragrance and/or flavour substance compositions with a suitable wax-like substance and by extrusion followed by solidification, if applicable in a suitable solvent, e.g. isopropanol.

A further aspect of the present invention relates to the use of a fragrance and/or flavour substance composition according to the invention for imparting, modifying and/or enhancing one or several olfactory and/or taste notes selected from the group consisting of the notes green, herbaceous, fresh, fruity, floral, woody, sweet, earthy, greasy, metallic and balsamic, preferably at least one of the olfactory and/or taste notes selected from the group consisting of the notes green and fruity, preferably at least one of the olfactory and/or taste notes selected from the group consisting of the notes banana, raspberry, blackcurrant and melon.

For preferred embodiments, what has been stated above in connection with a use according to the invention or fragrance and/or flavour substance composition according to the invention applies accordingly.

Fragrance and/or flavour substance compositions according to the invention may be used in concentrated form, in solutions or in modified form as described above for the manufacture of perfumed and/or flavoured articles according to the invention (as described below) such as e.g. perfume extracts, eau de parfums, eau de toilettes, aftershave lotions, eau de colognes, pre-shave products, splash colognes and perfumed refreshing wipes as well as perfuming of acidic, alkaline and neutral detergents, such as e.g. floor cleaners, window glass cleaners, dishwashing detergents, bathroom and sanitary cleaners, scouring milk, solid and liquid WC cleaners, powder and foam carpet cleaners, textile fresheners, ironing aids, liquid detergents, powder detergents, laundry pre-treatments such as bleaching agents, soaking agents and stain removers, fabric softeners, washing soaps, washing tablets, disinfectants, surface disinfectants and air fresheners in liquid or gel-like form or placed on a solid support, aerosol sprays, waxes and polishes such as furniture polishes, floor waxes, shoe polishes and body care products such as solid and liquid soaps, shower gels, shampoos, shaving soaps, shaving foams, bath oils, cosmetic emulsions of the oil-in-water, water-in-oil and water-in-oil-in-water type such as skin creams and lotions, facial creams and lotions, sun protection creams and lotions, after-sun creams and lotions, hand creams and lotions, foot creams and lotions, depilatory creams and lotions, after-shave creams and lotions, tanning creams and lotions, hair care products such as hair sprays, hair gels, solidifying hair lotions, hair conditioners, permanent and semi-permanent hair dyes, hair deformers such as cold waves and hair straighteners, hair toners, hair creams and lotions, deodorants and antiperspirants such as underarm sprays, roll-ons, deodorant sticks, deodorant creams, decorative cosmetic products such as eye shadows, nail varnishes, make-ups, lipsticks, mascara as well as candles, lamp oils, incense sticks, insecticides, repellents and fuels.

Another aspect of the present invention relates to a method for imparting, enhancing and/or modifying one or several olfactory and/or taste notes selected from the group consisting of the notes green, herbaceous, fresh, fruity, floral, woody, sweet, earthy, greasy, metallic and balsamic, preferably for imparting, enhancing and/or modifying one or several olfactory and/or taste notes selected from the group consisting of the notes green and fruity, preferably for imparting, enhancing and/or modifying one or several olfactory and/or taste notes selected from the group consisting of the notes banana, raspberry, blackcurrant and melon, comprising or consisting of the following steps:

(a) Providing
  (a.1) the compound of formula (I)

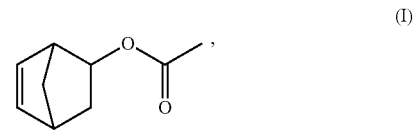

and
  (a.2) one, two, three, four, five, six, seven, eight, nine, ten or more further fragrance and/or flavour substance(s) with one or several olfactory and/or taste notes selected from the group consisting of the notes green, herbaceous, fresh, fruity, floral, woody, sweet, earthy, greasy, metallic and balsamic, preferably with one or several olfactory and/or taste notes selected from the group consisting of the notes green and fruity, preferably with one or several olfactory and/or taste notes selected from the group consisting of the notes banana, raspberry, blackcurrant and melon, (b) adding the compound of formula (I) (a.1) to the further fragrance and/or flavour substance(s) (a.2) in a sensorially effective amount, preferably in an amount sufficient to impart, enhance and/or modify one or several olfactory and/or taste notes selected from the group consisting of the notes green, herbaceous, fresh, fruity, floral, woody, sweet, earthy, greasy, metallic and balsamic, preferably in an amount sufficient to impart, modify and/or enhance one or several olfactory and/or taste notes selected from the group consisting of the notes green and fruity, preferably in an amount sufficient to impart, modify and/or enhance one or several olfactory and/or taste notes selected from the group consisting of the notes banana, raspberry, blackcurrant and melon.

In context of the method described herein for imparting, modifying and/or enhancing an olfactory and/or taste note, it is also recognised that the compound of formula (I) can function excellently as a so-called booster (enhancer).

A preferred embodiment therefore relates to a method according to the invention for modifying and/or enhancing (boosting) an odour and/or taste, in particular with one, several or all of the notes floral, fruity and/or woody, comprising or consisting of the following steps:
(a) Providing
  (a.1) the compound of formula (I)

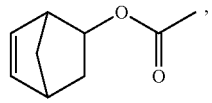

(I)

and
  (a.2) one or several further fragrance and/or flavour substances having one or several of the olfactory and/or taste notes selected from the group consisting of floral, fruity and/or woody,
(b) adding the compound of formula (I) (a.1) to the further fragrance and/or flavour substance(s) (a.2) in a sensorially effective amount, preferably in an amount sufficient to sensorially modify and/or enhance the olfactory and/or taste impression of the further fragrance and/or flavour substance(s) (a.2).

A further aspect of the present invention relates to a perfumed and/or flavoured article comprising or consisting of
(i) a fragrance and/or flavour substance composition (as described herein),
or
the compound of formula (I)

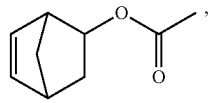

(I)

and one, two, three, four, five, six, seven, eight, nine, ten or more further fragrance and/or flavour substance(s), wherein the weight ratio of the total amount of compound of formula (I) to the total amount of further fragrance and/or flavour substance(s) is in the range from 1:1000 to 1:0.1, preferably from 1:1000 to 1:0.5, and preferably wherein one, several or all of the other fragrance and/or flavour substances impart a woody, fruity and/or floral odour and/or taste,
and
(ii) one or several further component(s), preferably at least one or several, preferably one, two, three, four, five or more, additive(s), excipient(s) and/or active substance(s).

For preferred embodiments, what has been stated above in connection with the use according to the invention, a fragrance and/or flavour substance composition according to the invention or a method according to the invention applies accordingly.

Preferred is a perfumed and/or flavoured article according to the invention selected from the group consisting of detergents and cleaning agents, hygiene or care products, preferably in the field of body and hair care, cosmetics and household, preferably from the group consisting of perfume extracts, eau de parfums, eau de toilettes, aftershave lotions, eau de colognes, pre-shave products, splash colognes, perfumed refreshing wipes, acidic, alkaline or neutral detergents, textile fresheners, ironing aids, liquid detergents, powder detergents, laundry pre-treatments, fabric softeners, washing soaps, washing tablets, disinfectants, surface disinfectants, air fresheners, aerosol sprays, waxes and polishes, body care products, hand creams and lotions, foot creams and lotions, depilatory creams and lotions, aftershave creams and lotions, tanning creams and lotions, hair care products, deodorants, antiperspirants, decorative cosmetic products, candles, lamp oils, incense sticks, insecticides, repellents and fuels.

In addition, for a perfumed and/or flavoured article according to the invention applies preferably,
that component (i) is contained in a sensorially effective amount, preferably in an amount sufficient for a consumer to detect one or several olfactory and/or taste notes selected from the group consisting of the notes green, herbaceous, fresh, fruity, floral, woody, sweet, earthy, greasy, metallic and balsamic, preferably one or several olfactory and/or taste notes selected from the group consisting of the notes green and fruity, preferably one or several olfactory and/or taste notes selected from the group consisting of the notes banana, raspberry, blackcurrant and melon,
and/or
that one, two, three, four, five, six, seven, eight, nine, ten or more of the further fragrance and/or flavour substances in component (i) impart, modify and/or enhance a woody, fruity and/or floral odour and/or taste.

It is also preferable when the perfumed and/or flavoured article contains a total amount of compound of formula (I), based on the total weight of the article, in the range from 0.00001 to 10% by weight, preferably from 0.0001 to 5% by weight, more preferably from 0.001 to 2% by weight, more preferably from 0.005 to 1% by weight.

The additives, excipients and/or active substances described above are preferably not fragrance and/or flavour substances and, if contained, are preferably selected from the group consisting of:

Preservatives, preferably those mentioned in US 2006/0089413, abrasives, anti-acne agents and sebum reducing agents, preferably those mentioned in WO 2008/046791, anti-aging agents, preferably those mentioned in WO 2005/123101, antibacterial agents, anti-cellulite agents, anti-dandruff agents, preferably those mentioned in WO 2008/046795, anti-inflammatory agents, irritation-preventing agents, anti-irritants (anti-inflammatory, irritation-inhibiting and irritation-preventing agents), preferably those mentioned in WO 2007/042472 and US 2006/0089413, antimicrobial agents, preferably those mentioned in WO 2005/123101, antioxidants, preferably those mentioned in WO 2005/123101, astringents, antiseptic agents, antistatic agents, binders, buffers, carrier materials, preferably those mentioned in WO 2005/123101, chelating agents, preferably those mentioned in WO 2005/123101, cell stimulants, cleansing agents, caring agents, depilatories, surfactants, deodorising agents and antiperspirants, preferably those mentioned in WO 2005/123101, plasticizers, emulsifiers, preferably those mentioned in WO 2005/123101, enzymes, essential oils, preferably those mentioned in US 2008/0070825, insect repellents, preferably those mentioned in WO 2005/123101, fibres, film-forming agents, (further) fixers, foaming agents, foam stabilisers, substances for the prevention of foaming, foam boosters, fungicides, gelling agents and gel-forming agents, preferably those mentioned in WO 2005/123101, hair care products, hair deforming agents, hair straightening agents, moisture regulators (moisturising and/or wetting agents and/or humectants), preferably those mentioned in WO 2005/123101, osmolytes, preferably those mentioned in WO 2005/123101, compatible solutes, preferably those mentioned in WO 01/76572 and WO 02/15686, bleaching agents, strengthening agents, stain removing agents, optical brightening agents, impregnating agents, soil repellents, friction reducing agents, lubricants, moisturizing creams, ointments, opacifiers, plasticising agents, covering agents, polish, brighteners, polymers, preferably those mentioned in WO 2008/046676, powders, proteins and protein hydrolysates, preferably those mentioned inWO 2005/123101 and WO 2008/046676, refattening agents, abrasive agents, skin-soothing agents, skin-cleansing agents, skin-care agents, skin repair agents, preferably containing cholesterol and/or fatty acids and/or ceramides and/or pseudoceramides, thereby preferably those mentioned in WO 2006/053912, skin whitening agents, preferably those mentioned in WO 2007/110415, skin protecting agents, skin softeners, skin cooling agents, preferably those mentioned in WO 2005/123101, skin warming agents, preferably those mentioned in WO 2005/123101, stabilisers, UV-absorbing agents and UV-filters, preferably those mentioned in WO 2005/123101, benzylidene-beta-dicarbonyl compounds, preferably those mentioned in WO 2005/107692, alpha-benzoyl cinnamic acid nitriles, preferably those mentioned in WO 2006/015954, AhR receptor antagonists, preferably those mentioned in WO 2007/128723 and WO 2007/060256, detergents, fabric softeners, suspending agents, skin tanning agents, preferably those mentioned in WO 2006/045760, thickeners, vitamins, preferably those mentioned in WO 2005/123101, fatty oils, waxes and fats, preferably those mentioned in WO 2005/123101, phospholipids, preferably those mentioned in WO 2005/123101, fatty acids (saturated fatty acids, mono- or polyunsaturated fatty acids, α-hydroxy acids, polyhydroxy fatty acids), preferably those mentioned in WO 2005/123101, dyes and colour protecting agents as well as pigments, preferably those mentioned in WO 2005/123101, anticorrosives, alcohols and polyols, preferably those mentioned in WO 2005/123101, surfactants, preferably those mentioned in WO 2005/123101, animal extracts, yeast extracts, extracts of algae or microalgae, electrolytes, liquefiers, organic solvents, preferably those mentioned in WO 2005/123101, hair growth modulating agents (hair growth promoting or hair growth inhibiting), preferably those mentioned in EP 2168570 and EP 2193785 or silicones and silicone derivatives, preferably those mentioned in WO 2008/046676,
preferably from the group consisting of preservatives, inorganic salts, chelating agents, surfactants, skin and/or hair caring agents, enzymes, emulsifiers, fats, fatty oils, waxes, fatty alcohols, silicones, silicone derivatives and water.

According to a preferred embodiment, the perfumed and/or flavoured article according to the invention, as described above, is a preparation intended for nutrition, oral care or pleasure (according to the invention).

Preparations intended for nutrition or pleasure are, for example, bakery products (e.g. bread, dry biscuits, cakes, other pastries), confectionery (e.g. chocolates, chocolate bar products, other bar products, fruit gums, hard and soft caramels, chewing gum), alcoholic or non-alcoholic beverages (e.g. coffee, tea, wine, beverages containing wine, beer, beverages containing beer, liqueurs, spirits, brandies, lemonades containing fruit, isotonic beverages, soft drinks, nectars, fruit and vegetable juices, fruit or vegetable juice preparations), instant beverages (e.g. instant cocoa drinks, instant tea drinks, instant coffee drinks), meat products (e.g. ham, fresh sausage or raw sausage preparations, seasoned or marinated fresh or salted meat products), eggs or egg products (dried egg, egg white, egg yolk), cereal products (e.g. breakfast cereals, muesli bars, pre-cooked ready-made rice products), dairy products (e.g. milk drinks, milk ice cream, yoghurt, kefir, cream cheese, soft cheese, hard cheese, dried milk powder, whey, butter, buttermilk, partially or completely hydrolysed products containing milk protein), products made from soy protein or other soybean fractions (e.g. soy milk and products made from it, preparations containing soy lecithin, fermented products such as tofu or tempeh or products made from them, soy sauces), fruit preparations (e.g. jams, fruit ice cream, fruit sauces, fruit fillings), vegetable preparations (e.g. ketchup, sauces, dried vegetables, frozen vegetables, pre-cooked vegetables, pickled vegetables, cooked vegetables), snacks (e.g. baked or deep-fried potato chips or potato dough products, bread dough products, corn or peanut-based extrudates), fat and oil-based products or emulsions thereof (e.g. mayonnaise, remoulade, dressings, seasoning preparations), other ready meals and soups (e.g. dry soups, instant soups, pre-cooked soups), spices, seasonings and in particular seasonings, which are used for example in the snack sector.

Preparations according to invention can be present e.g. as semi-finished product or as seasoning mixture.

Preparations according to the invention may in particular be used as semi-finished goods for the manufacture of further preparations intended for nutrition or pleasure (also according to the invention), in particular in spray-dried form. Preparations according to the invention may also be in the form of capsules, tablets (uncoated and coated tablets, e.g. enteric coatings), dragées, granules, pellets, solid mixtures, dispersions in liquid phases, emulsions, powders, solutions, pastes or other preparations which can be swallowed or chewed as food supplements.

Preparations intended for oral care according to the invention are in particular oral and/or dental hygiene products such as toothpastes, tooth gels, tooth powder, mouthwashes, chewing gums and other oral hygiene products.

Further active substances, basic substances, excipients and additives for preparations intended for nutrition, oral care or pleasure according to the invention may be contained in quantities of 5 to 99.9999% by weight, preferably 10 to 80% by weight, based on the total weight of the preparation. Furthermore, the preparations may contain water in an amount of up to 99.9% by weight, preferably 5 to 80% by weight, based on the total weight of the preparation.

Preparations according to the invention (as examples of articles according to the invention) are prepared according to a preferred embodiment by incorporating compounds as a substance, as a solution (e.g. in ethanol, water or 1,2-propylene glycol) or in the form of a mixture with a solid or liquid carrier (e.g. maltodextrin, starch, silica gel), other flavours or flavour substances and, where appropriate, further excipients and/or stabilisers (e.g. natural or artificial polysaccharides and/or plant gums such as modified starches or gum arabic) into a basis preparation intended for nutrition, oral care or pleasure. Advantageously, preparations according to the invention that are present in the form of a solution and/or suspension or emulsion can be converted into a solid preparation according to the invention (preferably semi-finished product) by spray drying.

The spray-dried solid preparations according to the invention (as further example of an article according to the invention) are particularly suitable as semi-finished products for the manufacture of further preparations according to the invention. The spray-dried solid preparations according to the invention preferably contain 50 to 95% by weight of carriers, in particular maltodextrin and/or starch, 5 to 40% by weight of excipients, preferably natural or artificial polysaccharides and/or plant gums such as modified starches or gum arabic.

According to a further preferred embodiment, the compound of formula (I) and, if applicable, other components of the preparation according to the invention are initially incorporated in emulsions, in liposomes, e.g. starting from phosphatidylcholine, in microspheres, in nanospheres or also in capsules, granules or extrudates of a matrix suitable for foodstuffs and luxury foods, e.g. from starch, starch derivatives (e.g. modified starch), cellulose or cellulose derivatives (e.g. hydroxypropylcellulose), other polysaccharides (e.g. dextrin, alginate, curdlan, carageenan, chitin, chitosan, pullulan), natural fats, natural waxes (e.g. beeswax, carnauba wax), from proteins, e.g. gelatine or other natural products (e.g. shellac). Thereby, depending on the matrix, the products can be obtained by spray drying, spray granulation, melt granulation, coacervation, coagulation, extrusion, melt extrusion, emulsion processes, coating or other suitable encapsulation processes and, if applicable, a suitable combination of the above-mentioned processes. In another preferred manufacturing process for a preparation according to the invention, compounds are first complexed with one or several complexing agents, for example with cyclodextrins or cyclodextrin derivatives, preferably α- or β-cyclodextrin, and used in this complexed form.

A preparation according to the invention is particularly preferred in which the matrix is selected in such a way that the compound of formula (I) is released from the matrix with a delay, so that a long-lasting effect is achieved. A fat, wax, polysaccharide or protein matrix is particularly preferred in this respect.

As other ingredients for preparations intended for nutrition or pleasure according to the invention, common raw materials, excipients or additives for foodstuffs and luxury foods can be used, e.g. water, mixtures of fresh or processed, vegetable or animal basic or raw materials (e.g. raw, roasted, dried, fermented, smoked and/or cooked meat, bones, cartilage, fish, vegetables, fruits, herbs, nuts, vegetable or fruit juices or pastes or mixtures thereof), digestible or non-digestible carbohydrates (e.g. sucrose, maltose, fructose, glucose, dextrins, amylose, amylopectin, inulin, xylans, cellulose, tagatose), sugar alcohols (e.g. sorbitol, erythritol), natural or hydrogenated fats (e.g. tallow, lard, palm fat, coconut fat, hydrogenated vegetable fat), oils (e.g. sunflower oil, peanut oil, corn oil, olive oil, fish oil, soybean oil, sesame oil), fatty acids or their salts (e.g. potassium stearate), proteinogenic or non-proteinogenic amino acids and related compounds (e.g. γ-aminobutyric acid, taurine), peptides (e.g. glutathione), native or processed proteins (e.g. gelatine), enzymes (e.g. peptidases), nucleic acids, nucleotides, taste correctives for unpleasant taste impressions, further taste modulators for further, generally not unpleasant taste impressions, other taste modulating substances (e.g. inositol phosphate, nucleotides such as guanosine monophosphate, adenosine monophosphate or other substances such as sodium glutamate or 2-phenoxypropionic acid), emulsifiers (e.g. lecithins, diacylglycerols, gum arabic), stabilizers (e.g. carageenan, alginate), preservatives (e.g. benzoic acid, sorbic acid), antioxidants (e.g. tocopherol, ascorbic acid), chelators (e.g. citric acid), organic or inorganic acidifiers (e.g. malic acid, acetic acid, citric acid, tartaric acid, phosphoric acid), bitter substances (e.g. quinine, caffeine, limonine, amarogentin, humolones, lupolones, catechins, tannins), mineral salts (e.g. sodium chloride, potassium chloride, magnesium chloride, sodium phosphates), enzymatic browning inhibitors (e.g. sulphite, ascorbic acid), essential oils, plant extracts, natural or synthetic dyes or colour pigments (e.g. carotenoids, flavonoids, anthocyanins, chlorophyll and their derivatives), spices, trigeminally active substances or plant extracts containing such trigeminally active substances, synthetic, natural or nature-identical flavour substances or fragrance substances as well as odour correctives.

Dental care agents (as basis for preparations intended for oral care according to the invention) generally comprise an abrasive system (abrasive or polishing agents) such as e.g. silicas, calcium carbonates, calcium phosphates, aluminium oxides and/or hydroxyapatites, surface active substances such as e.g. sodium lauryl sulphate, sodium lauryl sarcosinate and/or cocamidopropyl betaine, humectants such as e.g. glycerol and/or sorbitol, thickeners such as e.g. carboxymethylcellulose, polyethylene glycols, carrageenan and/or Laponite®, sweeteners such as e.g. saccharin, taste correctives for unpleasant taste impressions, taste correctives for further, generally not unpleasant taste impressions, taste modulating substances (e.g. inositol phosphate, nucleotides such as guanosine monophosphate, adenosine monophosphate or other substances such as sodium glutamate or 2-phenoxypropionic acid), cooling agents such as e.g. menthol, menthol derivatives (e.g. L-menthol, L-menthyl lactate, L-menthyl alkyl carbonates, menthone ketals, menthanecarboxylic acid amides), 2,2,2-trialkyacetic acid amides (e.g. 2,2-diisopropylpropionic acid methylamide), icilin and icilin derivatives, stabilisers and active ingredients, such as e.g. sodium fluoride, sodium monofluorophosphate, tin difluoride, quaternary ammonium fluorides, zinc citrate, zinc sulphate, tin pyrophosphate, tin dichloride, mixtures of various pyrophosphates, triclosan, cetylpyridinium chloride, aluminium lactate, potassium citrate, potassium nitrate, potassium chloride, strontium chloride, hydrogen peroxide, flavours and/or sodium bicarbonate or odour correctives.

Chewing gums (as further example for preparations intended for oral care according to the invention) generally comprise a chewing gum base, i.e. a chewing gum mass which becomes plastic when chewed, various types of sugar, sugar substitutes, other sweet-tasting substances, sugar alcohols, taste correctives for unpleasant taste impressions, other taste modulators for further, generally not unpleasant taste impressions, taste modulating substances (e.g. inositol phosphate, nucleotides such as guanosine monophosphate, adenosine monophosphate or other substances such as sodium glutamate or 2-phenoxypropionic acid), humectants, thickeners, emulsifiers, flavours and stabilisers or odour correctives.

A further aspect of the present invention relates to a method for perfuming and/or flavouring an article, comprising or consisting of the following steps:
(a) Providing
(a.1) a fragrance and/or flavour substance composition (as described herein)
or
(a.2) the compound of formula (I)

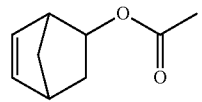

and optionally one, two, three, four, five, six, seven, eight, nine, ten or more further fragrance and/or flavour substance(s), wherein the weight ratio of the total amount of compound of formula (I) to the total amount of further fragrance and/or flavour substance(s) is in the range from 1:1000 to 1:0.1, preferably from 1:1000 to 1:0.5,
and
(b) adding the fragrance and/or flavour substance composition (a.1) or the compound/fragrance substances (a.2) to the article to be perfumed and/or flavoured, in a sensorially effective amount, preferably in an amount sufficient to impart, to enhance and/or to modify one or several olfactory and/or taste notes selected from the group consisting of the notes green, herbaceous, fresh, fruity, floral, woody, sweet, earthy, greasy, metallic and balsamic, preferably one or several of the olfactory and/or taste notes selected from the group consisting of the notes green and fruity, preferably one or several of the olfactory and/or taste notes selected from the group consisting of the notes banana, raspberry, blackcurrant and melon.

Furthermore, the present invention relates to a method for perfuming hair, skin, textile fibres, surfaces and/or ambient air comprising or consisting of the following steps:
(a) Providing
(a.1) a fragrance and/or flavour substance composition (as described herein), preferably containing a surfactant or a surfactant mixture,
or
(a.2) the compound of formula (I)

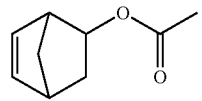

and optionally one, two, three, four, five, six, seven, eight, nine, ten or more further fragrance and/or flavour substance(s), wherein the weight ratio of the total amount of compound of formula (I) to the total amount of further fragrance and/or flavour substance(s) is in the range from 1:1000 to 1:0.1, preferably from 1:1000 to 1:0.5,
and also preferably a surfactant or a surfactant mixture,
or
(a.3) an article according to the invention (as described herein), preferably containing a surfactant or a surfactant mixture,
and (b) applying or introducing the fragrance and/or flavour substance composition (a.1) or the compound/fragrance substance (a.2) or the article (a.3) to the hair or skin or fibres or surface to be perfumed, or into the ambient air to be perfumed in a sensorially effective amount, preferably in an amount sufficient for the consumer to detect one or several olfactory and/or taste notes selected from the group consisting of the notes green, herbaceous, fresh, fruity, floral, woody, sweet, earthy, greasy, metallic and balsamic, preferably at least one of the olfactory and/or taste notes selected from the group consisting of the notes green and fruity, preferably at least one of the olfactory and/or taste notes selected from the group consisting of the notes banana, raspberry, blackcurrant and melon.

For preferred embodiments of the methods described herein, what has been stated in connection with uses according to the invention or fragrance and/or flavour substance compositions according to the invention or articles according to the invention applies accordingly.

In the following, the invention is explained in more detail using examples. Unless otherwise stated, all data refers to weight.

Abbreviations used: DPG=dipropylene glycol, TEC=triethyl citrate

EXAMPLE 1

Manufacturing of 5-bicyclo[2.2.1]hept-2-enyl-acetate (Compound Formula (I))

117 g dicyclopentadiene and 172 g vinyl acetate are placed in a 500 ml autoclave and heated to 190° C. in about 30 minutes at an initial nitrogen pressure of 5 bar. The pressure thereby rises to approx. 13 bar. Stirring is carried out for 7-8 hours at 190° C. After cooling down, the raw batch is removed from the autoclave and freed from light boilers.

Raw yield: 121 g; distillation at a 40 cm FKK, bp.: 58°–60° C./7 mbar

Yield: 106 g (87.4% of the theoretical yield), the product consists of exo/endo isomers (19/81%)

GC evaluation (20 m DB-WAX, inner diameter 0.18 μm/60-9-220° C. cold feed system)

$^1$H-NMR (CDCl$_3$): δ 6.34 (dd, J=5.7, 3.0 Hz, 1H), 6.23 (dd, J=5.8, 2.9 Hz, 1H), 5.99-5.98 (m, 1H), 5.97 (dd, J=5.8, 2.9 Hz, 1H), 5.27 (ddd, J=8.2, 3.8, 2.8 Hz 1H), 4.65 (dp, J=7.0, 1.1 Hz, 1H), 3.14 (h, J=1.9, 1.4 Hz, 1H), 2.88 (dt, J=3.0, 1.4 Hz, 1H), 2.86-2.81 (m, 2H), 2.14 (ddd, J=12.2, 8.2, 3.8 Hz, 1H), 2.04 (s, 3H), 1.70 (ddd, J=12.6, 7.0, 2.8 Hz, 1H), 1.47 (ddt, J=8.9, 3.8, 1.9 Hz, 1H), 1.41 (dt, J=12.6, 3.5, 2.4 Hz, 1H), 1.32 (d, J=8.8 Hz, 1H), 0.93 (dt, J=12.5, 3.3 Hz, 1H).

$^{13}$C-NMR (CDCl$_3$): δ 171.4, 171.2, 141.1, 138.5, 132.6, 131.6, 75.3, 75.1, 47.7, 47.3, 46.2, 45.8, 42.2, 40.6, 34.58, 34.56, 21.4, 21.2 ppm.

MS: m/z (%)=152 (7), 109(2), 91(10), 81(11), 66(100), 53(4), 43(36)

MS: m/z (%)=152 (9), 109(2), 91(9), 81(12), 66(100), 53(4), 43(42)

EXAMPLE 2

Perfume Composition (Fragrance Substance Composition)

| | |
|---|---|
| AGRUMEX LC | 2.5 |
| ALDEHYDE C16 SOG. | 1 |
| AMBROXIDE | 10 |
| BENZALDEHYDE DD 10% DPG | 4 |
| CASHMERANE | 15 |
| CITRONELLOL 950 | 9 |
| DAMASCENONE TOTAL 10% DPG | 10 |
| DAMASCONE ALPHA 10% DPG | 4 |
| DECALACTONE GAMMA 1% DPG | 2 |
| DIMETHYLBENZYLCARBINYL BUTYRATE | 1.5 |
| DIPROPYLENE GLYCOL | 242.5 |
| ETHYL BUTYRATE 1% DPG | 5 |
| ETHYLENE BRASSYLATE | 400 |
| ETHYL MALTOL | 6.5 |
| ETHYLMETHYL BUTYRATE-2 | 1 |
| ETHYL PROPIONATE 1% DPG | 3 |
| ETHYL VANILLIN 10% DPG | 5 |
| FRAMBINON® | 2.5 |
| GALAXOLID 50% IN IPM | 100 |
| HEDIONE | 110 |
| HEXENOL TRANS-2 1% DPG | 2 |
| HEXENYL ACETATE CIS-3 1% DPG | 3 |
| HEXYL CINNAMIC ALDEHYDE ALPHA | 10 |
| IONONE BETA | 1.5 |
| ISOAMYLALCOHOL 1% DPG | 2 |
| ISOBUTYL ACETATE 1% DPG | 5 |
| LINALOOL | 6 |
| LYCHEE E 9518726/01 TYPE BASE 10% DPG | 5 |
| MACROLIDE® SUPRA | 150 |
| CLEMENTINE OIL ENTF. | 18 |
| CLOVE LEAF OIL 1% DPG | 8 |
| Neo Heliopan® OS | 10 |
| OLIBANUM OIL 10% DPG | 10 |
| OXANE 1% DPG | 8 |
| PATCHOULI OIL ENTF. | 6 |
| PHENYLETHYLALCOHOL | 10 |
| ROSE ABS. 10% DPG | 1 |
| ROSE OIL BULG. 10% DPG | 2 |
| ROSE OXIDE HIGH CIS 10% DPG | 2 |
| TERPINEOL PURE 10% DPG | 1 |
| VANILLIN | 5 |

According to the perfumers, the addition of 0.03% by weight of the compound of formula (I) (e.g. product from example 1) makes this perfume composition more rounded, natural and harmonious, adding a fresh, fruity top note and enhancing the floral aspects towards violets. The compound of formula (I) gives the composition an individual character and combines the different olfactory elements.

EXAMPLE 3

Parfume Composition (Fragrance Substance Composition)

| | |
|---|---|
| ALDEHYDE C18 SOG. 10% DPG | 5 |
| APPLE RED AROMABASE | 20 |
| DIPROPYLENE GLYCOL | 7 |
| ETHYLMALTOL 10% DPG | 2 |
| ISOAMYLBUTYRATE | 4 |
| METHYLANTHRANILATE | 2 |
| AGRUMEX LC | 60 |
| ALDEHYDE C10 10% DPG | 2 |
| ALDEHYDE C12 LAURIN 10% DPG | 5 |
| ALDEHYDE C14 SOG | 35 |
| ALLYLHEPTYLATE | 15 |
| AMBRETTOLIDE | 8 |
| APPLE RED AROMABASE | 5 |
| BENZALDEHYDE DD | 1 |
| BENZYLISOBUTYRATE | 2 |
| CASHMERAN 10% DPG | 1 |
| CITRONELLOL 950 | 10 |
| CYCLAMENALDEHYDE | 2 |
| DAMASCONE ALPHA 1% DPG | 15 |
| DECALACTONE GAMMA | 5 |
| DIHYDROMYRCENOL | 50 |
| DIMETHYLBENZYLCARBINYLBUTYRATE | 5 |
| DIPROPYLENE GLYCOL | 280 |
| ETHYLBUTYRATE 10% DPG | 1 |
| ETHYLCAPRONATE 1% DPG | 5 |
| ETHYLENE BRASSYLATE | 40 |
| ETHYL ISOBUTYRATE | 0.5 |
| ETHYL LACTATE | 0.5 |
| ETHYLMETHYL BUTYRATE-2 | 6 |
| HEDIONE | 15 |
| HERBYL PROPIONATE | 20 |
| HEXENAL TRANS-2 1% DPG | 15 |
| HEXENOL CIS-3 | 1 |
| HEXENYL ACETATE CIS-3 | 3 |
| HEXYL ACETATE | 10 |
| HEXYL SALICYLATE | 70 |
| HEXYL CINNAMIC ALDEHYDE ALPHA | 45 |
| IONONE BETA | 15 |
| ISO E SUPER | 4 |
| ISOAMYL BUTYRATE | 1.5 |
| ISOAMYL SALICYLATE | 10 |
| LIGUSTRAL | 3 |
| MANZANATE 10% DPG | 4 |
| MUGETANOL | 3 |
| NEONONYL ACETATE | 5 |
| NOPYL ACETATE | 3 |
| ORANGE OIL | 10 |
| ORYCLON® SPECIAL | 12 |
| PHENIRAT® | 110 |
| PHENOXANOL | 6 |
| PRENYL ACETATE | 2.5 |
| TERPINEOL PURE | 3 |
| TETRAHYDROLINALOOL | 25 |
| PRENYL ACETATE | 10 |

In the opinion of perfumers, the addition of 0.6% by weight of compound of formula (I) (e.g. product from example 1) makes this perfume composition stronger and more natural, adding a distinct fruity note of melon. The compound of formula (I) gives the composition a richer character and combines the different olfactory elements.

EXAMPLE 4

Shampoo

The compound of formula (I) (e.g. product from example 1) was incorporated in a dosage of 0.5% by weight into a shampoo base of the following composition:

| | |
|---|---|
| Sodium lauryl ether sulphate (e.g. Texapon NSO, Cognis Deutschland GmbH) | 12% |
| Cocamidopropylbetaine (e.g. Dehyton K, Fa. Cognis Deutschland GmbH) | 2% |
| Sodium chloride | 1.4% |
| Citric acid | 1.3% |
| Phenoxyethanol, Methyl, Ethyl, Butyl, and Propyl paraben | 0.5% |
| Water | 82.8% |

The pH value of the shampoo base was about 6, from which 100 mL of a 20% by weight aqueous shampoo solution were prepared. In this shampoo solution, two hair strands were washed together for 2 minutes and then rinsed for 20 seconds under running, hand-warm water. One hair strand was wrapped in wet condition in aluminium foil and the second strand was dried with a hair dryer. Both hair strands were olfactorily assessed by a panel.

Odour description of both hair strands: Banana, raspberry, blackcurrant, melon

EXAMPLE 5

Fabric Softener

The perfume composition from example 2 with addition of 0.03% by weight of compound (I) (e.g. product from example 1) was incorporated in a dosage of 0.5% by weight into a fabric softener base of the following composition:

| | |
|---|---|
| Quaternary ammonium methosulphate (esterquat), approx. 90% (e.g. Rewoquat WE 18, Witco Surfactants GmbH) | 5.5% |
| Alkyldimethylbenzylammonium chloride, approx. 50% (e.g. Preventol R50, Bayer AG) | 0.2% |
| Colour solution, approx. 1% | 0.3% |
| Water | 94.0% |

The pH value of the fabric softener base was in the range of 2 to 3. Two fabric cloths were rinsed in a linetest machine for 30 minutes at 20° C. in the fabric softening program with 370 g of a 1% aqueous fabric softener solution based on 0.5% by weight of the fabric softener base comprising the perfume composition from example 2. The cloths were wrung out and then spun for 20 seconds. One cloth was shrink-wrapped in wet condition and one was hung up to dry. Afterwards, both cloths were olfactorily assessed by a panel.

Odour description of both cloths: rounded, natural and harmonious, with a fresh, fruity top note and floral aspects in the direction of violets.

EXAMPLE 6

Washing Powder

The perfume oil composition from example 3 (after addition of 0.6% by weight of compound (I) (e.g. product from example 1)) was incorporated in a dosage of 0.4% by weight into a washing powder base of the following formulation:

| | |
|---|---|
| Linear Na-alkyl benzenesulfonate | 8.8% |
| Ethoxylated fatty alcohol C12-18 (7 EO) | 4.7% |
| Na soap | 3.2% |
| Defoamer DOW CORNING 2-4248S POWDERED ANTIFOAM, silicone oil on zeolite as carrier material | 3.9% |
| Zeolite 4A | 28.3% |
| Na-carbonate | 11.6% |
| Na salt of a copolymer of acrylic and maleic acid (Sokalan CP5) | 2.4% |
| Sodium silicate | 3.0% |
| Carboxymethyl cellulose | 1.2% |
| Dequest 2066 ([[(Phosphonomethyl)imino]bis[(ethylenenitrilo)bis(methylene)]]tetrakis-phosphonic acid, sodium salt) | 2.8% |
| Optical brightener | 0.2% |
| Na-sulphate | 6.5% |
| Protease | 0.4% |
| Sodium perborate tetrahydrate | 22.0% |
| TAED | 1.0% |

Two cloth cloths were washed in a linetest machine in the main wash cycle for 45 minutes at 60° C. with 370 g of a 1% aqueous washing powder alkaline solution based on the 0.4% by weight of the washing powder base comprising the perfume oil composition from example 3 (the pH value of the washing powder alkaline solution is clearly in the basic range). The cloths were first rinsed with cold water for 5 minutes, wrung out and then spun for 20 seconds. One cloth was shrink-wrapped in wet condition and one was hung up to dry. Afterwards both cloths were olfactorially judged by a panel.

Odour description respectively: strong, natural and fruity melon note with a rich character.

The invention claimed is:

1. A fragrance and/or flavour substance composition comprising a compound of formula (I)

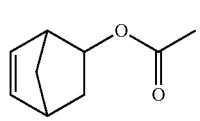

and one or more further fragrance and/or flavour substance(s), wherein a weight ratio of a total amount of the compound of formula (I) to a total amount of the further fragrance and/or flavour substance(s) is from 1:1000 to 1:0.1.

2. The fragrance and/or flavour substance composition according to claim 1, wherein a total amount of the compound of formula (I), based on a total weight of the fragrance and/or flavour substance composition, is from 0.0001 to 99.9% by weight.

3. The fragrance and/or flavour substance composition according to claim 1, wherein a total amount of the compound of formula (I) in fragrance and/or flavour substance composition is an amount sufficient to impart and/or enhance one or several olfactory and/or taste notes selected from green, herbaceous, fresh, fruity, floral, woody, sweet, earthy, greasy, metallic and balsamic.

4. The fragrance and/or flavour substance composition according to claim 1, wherein the one or more further fragrance and/or flavour substances impart, modify and/or enhance one or more olfactory and/or taste notes selected from green, herbaceous, fresh, fruity, floral, woody, sweet, earthy, greasy, metallic and balsamic.

5. A method for imparting, enhancing and/or modifying one or more olfactory and/or taste notes selected from green, herbaceous, fresh, fruity, floral, woody, sweet, earthy, greasy, metallic and balsamic, comprising:
(a) providing
(a.1) the compound of formula (I)

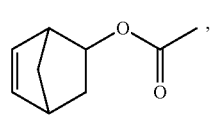

and
(a.2) one or more further fragrance and/or flavour substance(s) with one or more olfactory and/or taste notes selected from green, herbaceous, fresh, fruity, floral, woody, sweet, earthy, greasy, metallic and balsamic, (b) adding combining the compound of formula (I) (a.1) with the further fragrance and/or flavour substance(s) (a.2) in a sensorially effective amount.

6. A perfumed and/or flavoured article comprising:
   (i) a fragrance and/or flavour substance composition according to claim 1, and
   (ii) one or more further component(s).

7. The perfumed and/or flavoured article according to claim 6, wherein the article is selected from detergents, cleaning agents, hygiene or care products, cosmetics perfumed refreshing wipes, acidic, alkaline or neutral detergents, textile fresheners, ironing aids, liquid detergents, powder detergents, laundry pre-treatments, fabric softeners, washing soaps, washing tablets, disinfectants, surface disinfectants, air fresheners, aerosol sprays, waxes and polishes, body care products, hand creams and lotions, foot creams and lotions, depilatory creams and lotions, aftershave creams and lotions, tanning creams and lotions, hair care products, deodorants, antiperspirants, decorative cosmetic products, candles, lamp oils, incense sticks, insecticides, repellents and fuels.

8. The perfumed and/or flavoured article according to claim 6, wherein component (i) is in an amount sufficient for a consumer to detect one or more olfactory and/or taste notes selected from green, herbaceous, fresh, fruity, floral, woody, sweet, earthy, greasy, metallic and balsamic.

9. The perfumed and/or flavoured article according to claim 6, wherein a total amount of the compound of formula (I), based on a total weight of the article, is from 0.00001 to 10% by weight.

10. A method for perfuming and/or flavouring an article, comprising:
    (a) providing
        (a.1) a fragrance and/or flavour substance composition according claim 1, or
        (a.2) the compound of formula (I)

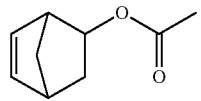
(I)

and
    (b) adding the fragrance and/or flavour substance composition (a.1) or the compound (a.2) to the article to be perfumed and/or flavoured, in a sensorially effective amount.

11. A method for perfuming hair, skin, textile fibres, surfaces and/or ambient air comprising:
    (a) providing
        (a.1) the fragrance and/or flavour substance composition according to claim 1, or
        (a.2) the compound of formula (I)

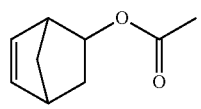
(I)

or (a.3) an article comprising:
        (i) the fragrance and/or flavour substance composition of (a.1) or the compound of formula (I) of (a.2),
    and
    (b) applying or introducing the fragrance and/or flavour substance composition (a.1) or the compound (a.2) or the article (a.3) to the hair or skin or fibres or surface to be perfumed, or into ambient air to be perfumed, in a sensorially effective amount.

12. The fragrance and/or flavour substance composition according to claim 1, wherein a weight ratio of the total amount of the compound of formula (I) to a total amount of the further fragrance and/or flavour substance(s) is from 1:1000 to 1:0.5.

13. The fragrance and/or flavour substance composition according to claim 1, wherein a total amount of the compound of formula (I), based on a total weight of the fragrance and/or flavour substance composition is from 0.01 to 99% by weight.

14. The fragrance and/or flavour substance composition according to claim 1, wherein a total amount of the compound of formula (I) in the fragrance and/or flavour substance composition is an amount sufficient to impart and/or enhance one or several olfactory and/or taste notes selected from green and fruity.

15. The fragrance and/or flavour substance composition according to claim 1, wherein a total amount of the compound of formula (I) in the fragrance and/or flavour substance composition is an amount sufficient to impart and/or enhance one or several olfactory and/or taste notes selected from banana, raspberry, blackcurrant and melon.

16. The fragrance and/or flavour substance composition according to claim 1, wherein the one or more further fragrance and/or flavour substances impart, modify and/or enhance one or more olfactory and/or taste notes selected from green and fruity.

17. The fragrance and/or flavour substance composition according to claim 1, wherein the one or more further fragrance and/or flavour substances impart, modify and/or enhance one or more olfactory and/or taste notes selected from banana, raspberry, blackcurrant and melon.

18. The perfumed and/or flavoured article according to claim 6, wherein the one or more further component(s) of (ii) are selected from additive(s), excipient(s) and/or active substance(s).

19. The perfumed and/or flavoured article according to claim 6, wherein component (i) is in an amount sufficient for a consumer to detect one or more olfactory and/or taste notes selected from green and fruity.

20. The perfumed and/or flavoured article according to claim 6, wherein a total amount of the compound of formula (I), based on the total weight of the article, is from 0.005 to 1% by weight.

* * * * *